July 25, 1944.  V. S. ANDERSON  2,354,241

SELF-TRIMMING MOLD

Filed March 30, 1942

Inventor
Volney S. Anderson.

Attorney.

Patented July 25, 1944

2,354,241

UNITED STATES PATENT OFFICE 2,354,241

SELF-TRIMMING MOLD

Volney S. Anderson, Los Angeles, Calif.

Application March 30, 1942, Serial No. 436,785

5 Claims. (Cl. 18—42)

This invention relates to plastic molds and, in some of its more particular aspects, it has to do with self-trimming molds and improved master plates for holding mold elements.

In the molding of plastic articles, and particularly pliable articles molded from rubber and like compositions, it is necessary initially to place in the mold a quantity of the composition in excess of the capacity of the article cavity. Thus, when pressure is applied to the mating mold, the excess of compound is forced out of the article cavity, between the mold plates, into a surrounding overflow cavity. After the molded article is removed from the mold, this overflow or flash portion must be trimmed off before the article is ready for use. Although, by following conventional practice, there is usually a relatively thin web portion between the article and the flash, at best this relatively thin web merely defines a line along which the article must be trimmed as by shears or cutters. This heretofore necessary trimming operation has rendered the cost relatively excessive.

It is therefore among the objects of my invention to provide what may be aptly termed a self-trimming mold—that is, a mold in which, among its other distinctive characteristics, the article cavity is separated from the overflow space or cavity by contacting shear edges which sever the overflow flash from the article and eliminate the necessity of the objectionable and costly trimming operation.

Another feature of my invention is a novel mold construction embodying highly efficient means for providing for and controlling the flash or overflow in a manner to produce an improved product and render unnecessary any careful measuring of the initial charge inserted in the mold. That is, in the curing of rubber compositions in the mold, gases are released in the mold cavity, causing some gas pressure. Unless proper control of this pressure is obtained, either the molded article will be objectionably porous or blistered or else it becomes difficult or impossible to obtain proper closing and register or contact of the mating mold and master plates. By the novel means which I provide for controllably relieving the article cavity of this gas pressure and for taking care of the flash or overflow, I am able to obtain an improved product as well as improved operation.

My invention also embraces improvements in the master plate and means for releasably securing the mating mold elements in properly adjusted position.

Still further objects and corresponding advantages are inherent in my invention and how those as well as those specifically enumerated hereinabove are achieved will become apparent to those skilled in the art from the following detailed description of a presently preferred mold and master plate embodying my invention in one of the forms which it may take. For this purpose I shall now refer to the accompanying drawing, in which.

Figure 1:
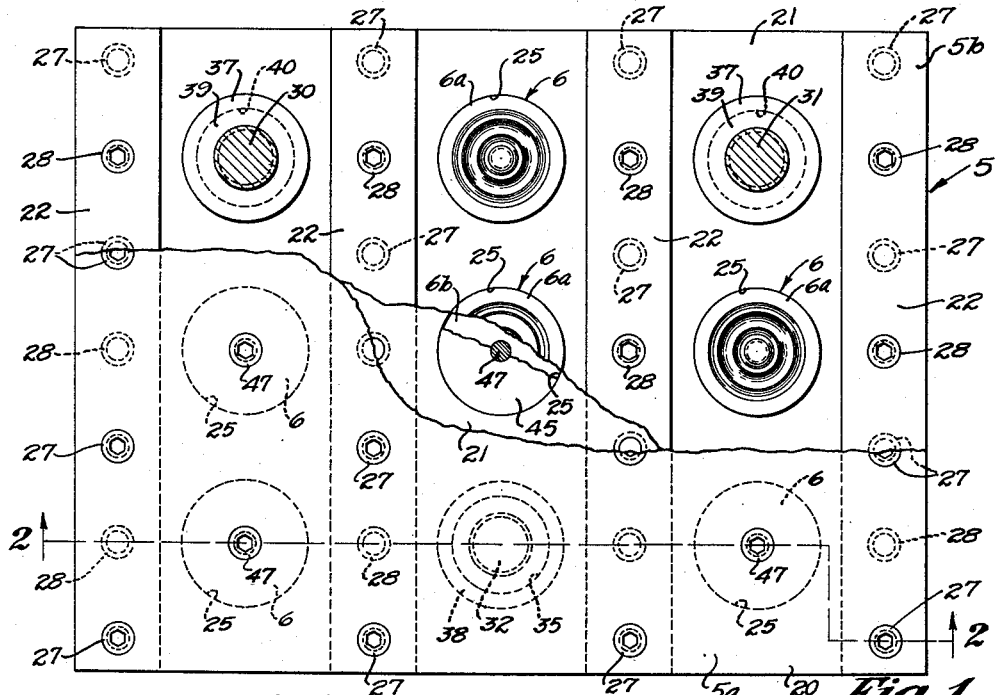
Fig. 1 is a plan view of the master plate containing a plurality of my mold elements, parts being broken away for illustrative purposes.

In the drawing, the numeral 5 generally designates the master plate, comprising the upper half 5a and the lower half 5b; and the numeral 6 generally designates a mating pair of mold plates comprising companion plates 6a and 6b.

Figures 3, 4:
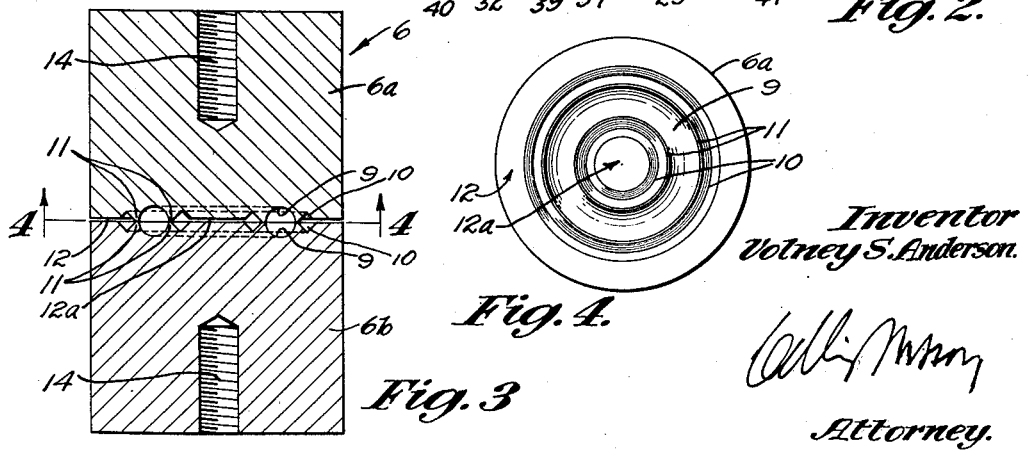
Fig. 3 is a longitudinal medial section of a set of mating mold elements.
Fig. 4 is an elevation taken on line 4—4 of Fig. 3.

Each of the plates 6a, 6b is shown as being round in cross-section and is first machined to provide an article cavity 9 and adjacent overflow cavities 10, which cavities mate when the plates 6a and 6b are placed in the master plate in face to face relation as will be hereinafter described. While my invention contemplates and may employ article cavities of any desired plan or cross-sectional shape, I here illustrate the complete cavity formed by the two mating article cavities 9 as being round in plan and cross-section, as for the molding of a rubber ring or the like. Each cavity 9 is separated from the adjacent overflow cavity 10 by a shear edge 11 preferably of the order of .005 of an inch in width. In longitudinal section each edge 11 would present microscopic undulations, in the manner of relatively sharp edges. When the mating halves 6a, 6b are properly positioned in the cavities of the master plate and pressure applied to the opposed halves of the master plate, edges 11 are the only points of the opposed faces of the halves 6a, 6b in contact. As best shown in Fig. 3, each of the overflow cavities 10 provided by the mating plates merges into a communicating space provided between the plates. These spaces are designated by the numerals 12, 12a respectively and are provided as auxiliary overflow areas for the principal purpose of permitting, yet so restricting, the overflow as to cause sufficient "back pressure" on the article cavity to avoid objectionable porosity of the molded product while not preventing proper mating and contacting of the mating mold elements. Aside from the advantages just described, these auxiliary overflow spaces 12, 12a render the mold more adaptable to working with relatively unmeasured charges of the molding compound. Space 12a is substantially sealed from atmosphere when in use, that is, after the shearing edges are in contact, while space 12 preferably communicates with atmosphere.

While I have termed the overflow spaces 12, 12a auxiliary overflow spaces, I do not mean to imply that they are necessarily auxiliary to the relatively larger communicating overflow cavities 10. In fact, in some cases I may eliminate the larger overflow cavities 10 and have the spaces 12, 12a extend to the shear edges 11 surrounding the article cavity.

The tolerance between the mating faces of plates 6a, 6b which provides the overflow spaces 12, 12a is preferably of the order of .007 of an inch since I find this width to be adaptable for more universal use. This tolerance, however, is determined largely by the relative hardness of the plastic composition used in the mold and the pressures employed on the mold. Typically the composition may be of a 75 Shore hardness and the pressures employed may be typically 35–40 pounds per square inch, and for such hardness and pressure I find a tolerance of .007 of an inch ideal. For less hardness or greater pressures, this tolerance may be decreased slightly, or for greater hardness or lesser pressures it may be commensurately increased.

After thus machining the mating faces of the mold plates 6a, 6b to provide the article cavity, overflow cavities and auxiliary overflow spaces, the steel plates 6a, 6b are preferably suitably hardened before being placed into use.

For the purposes to be hereinafter described, I provide medially in the outer end of each plate 6a, 6b a threaded hole 14.

With more particular reference now to the master plates 5a, 5b, each is comprised of two superposed companion plates 20, 21 and parallel longitudinal spacer ribs 22, the latter being disposed along each side edge and between each of the aligned rows of mold plate cavities 25 provided through the inner plate 21.

Figure 2:
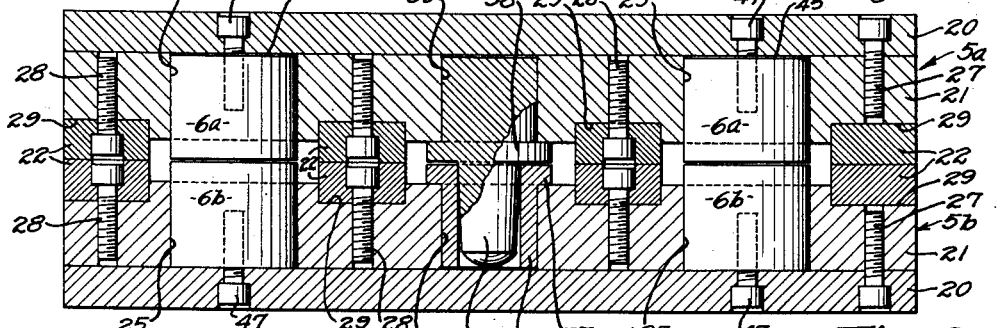
Fig. 2 is a section taken on line 2—2 of Fig. 1.

As best shown in Fig. 2, plates 20, 21 are held in superposed relation by cap screws 27 and the spacer ribs 22 are held within the longitudinal grooves 29 provided in each inner plate 21 by cap screws 28.

Tapered dowel pins 30, 31, 32 are force-fitted into each of the three cavities 35, provided through plate 21 of master plate 5a, each dowel pin presenting an annular positioning flange 38; and corresponding dowel holes of uniform diameter are provided by the respective bushings 39 force-fitted into the respective cavities 40 provided through the inner plate 21 of master plate 5b; each of the bushings presenting an annular flange 37 registering with the flange 38 of the adjacent dowel pin.

In each of the mold plate cavities 25 in master plate 5a, I mount one of the mold plates 6a and in each of said cavities in mold plate 5b I mount one of the mold plates 6b, or vice versa, so that when the master plates are superposed in the position of Fig. 2 the article cavities, overflow cavities and overflow spaces of each pair of mold plates mate, with the shear edges 11 in contact with each other. In use, the shear edges 11 are disposed in the same plane with the mating faces of ribs 22, and for the purpose of effecting this coplanar adjustment, I may provide shims 46 between the outer ends of the respective mold plates 6a, 6b and the adjacent outer plates 20. When thus properly positioned, I screw a cap screw 47 into the threaded hole 14 provided in the outer end of each mold plate whereby to lock the mold plates in position.

In view of the substantial pressures employed on such molds and the relatively narrow shearing edges 11 which are in contact with each other, it will be readily understood that it is important to obtain proper hardening and accurate machining of the parts so that the spacer ribs 22 will prevent deformation of the edges 11. Each of the master plate elements 5a, 5b is comprised of the two plates 20, 21 to facilitate manufacture. By this procedure the mold recesses 25 may be bored entirely through the inner plate 21 and have their outer ends covered by the outer plate 20 to protect the mold elements 6 and to provide means for locking said mold elements in position as described. The spacer ribs are likewise preliminarily ground on both sides and after all said ribs are secured to the plates I surface grind them simultaneously in their mountings to insure true coplanar surfaces. Having thus obtained true coplanar surfaces on the spacer ribs, it is relatively simple, by employing a straight edge, to adjust the mold elements 6 in the recesses so that their sharp edges 11 will be coplanar with the rib surfaces.

In carrying out a molding operation by the use of my device, a charge of the plastic composition such as rubber is placed between each of the pairs of mating heated mold elements before the master plates are superposed one on the other. The thus prepared mold is then placed under suitable pressure, which forces any excess charge out of the article cavities into the overflow cavities 10 and thence into the relatively restricted overflow spaces 12, 12a. After a suitable curing period, the master plates with their carried mating mold elements are then separated and the molded product stripped from the mold cavities in a trimmed condition since the shearing edges 11 will have sheared off the flash from the article.

The broad concept of my invention, as defined by the appended claims, of course may be carried out in structures varying from that herein specifically described, so that the details which I have hereinbefore employed to illustrate an adaptation of my invention are not to be taken as limitative.

I claim:

1. A device for molding plastic articles comprising companion master plates, a pair of spacer ribs detachably disposed transversely of each plate, the ribs of each plate being adapted to have face to face contact with the ribs of the other plate, registering mold receiving recesses in the plates between adjacent ribs, companion mold elements mounted in opposed relationship in the said recesses, mating article cavities and adjacent mating overflow cavities in the adjacent faces of the mold elements, and registering wall portions on said companion mold elements between the article and overflow cavities, the outer surface of said wall portion of each mold element being positioned coplanar with the outer faces of the spacer ribs carried by the plate in which the mold element is mounted.

2. A device for molding plastic articles comprising companion master plates, a pair of spacer ribs detachably disposed transversely of each plate, the ribs of each plate being adapted to have face to face contact with the ribs of the other plate, registering mold receiving recesses in the plates between adjacent ribs, companion mold elements mounted in opposed relationship in the said recesses, mating article cavities and adjacent mating overflow cavities in the adjacent faces of the mold elements, registering wall portions on said companion mold elements between the article and overflow cavities, the outer surface of said wall portion of each mold element being adapted to be positioned coplanar with the outer faces of the spacer ribs carried by the plate in which the mold element is mounted, and means for adjustably securing the respective mold elements in the respective mold receiving recesses whereby to so aline the outer surfaces of the respective wall portions with said spacer ribs.

3. A device for molding plastic articles comprising companion master plates, a pair of spacer ribs detachably disposed transversely of each plate, the ribs of each plate being adapted to have face to face contact with the ribs of the other plate, registering mold receiving recesses in the plates between adjacent ribs, companion mold elements mounted in opposed relationship in the said recesses, mating article cavities and adjacent mating overflow cavities in the adjacent faces of the mold elements, and registering wall portions on said companion mold elements between the article and overflow cavities, the outer surface of said wall portion of each mold element providing a cutting edge and positioned coplanar with the outer faces of the spacer ribs carried by the plate in which the mold element is mounted.

4. A device for molding plastic articles comprising companion master plates, a pair of spacer ribs detachably disposed transversely of each plate, the ribs of each plate being adapted to have face to face contact with the ribs of the other plate, registering mold receiving recesses in the plates between adjacent ribs, companion mold elements mounted in opposed relationship with their inner ends in the said recesses, mating article cavities and adjacent mating overflow cavities in the adjacent faces of the mold elements, registering wall portions on said companion mold elements between the article and overflow cavities, the outer surface of said wall portion of each mold element providing a cutting edge and being adapted to be positioned coplanar with the outer faces of the spacer ribs carried by the plate in which the mold element is mounted, and means for adjustably securing the respective mold elements in the respective mold receiving recesses whereby to so aline the outer surfaces of the respective wall portions with said spacer ribs, said means including a spacer member interposed between the inner end of each mold element and the bottom of the recess and a screw extending through the carrying master plate and threadedly engaging the inner end of the mold element.

5. A device for molding plastic articles comprising companion master plates, a pair of parallel transverse grooves in the adjacent surfaces of the plates, spacer ribs disposed one in each of the grooves, the ribs of each plate being adapted to have face to face contact with the ribs of the other plate, registering mold receiving recesses in the plates between adjacent grooves, companion mold elements mounted in mating relationship in the said recesses, mating article cavities and adjacent mating overflow cavities in the mating faces of the mold elements, and registering wall portions on the mold elements between the article and overflow cavities, the outer surface of said wall portion of each mold element being positioned coplanar with the outer faces of the spacer ribs carried by the plate in which the mold element is mounted.

VOLNEY S. ANDERSON.